Patented Dec. 10, 1929

1,738,940

UNITED STATES PATENT OFFICE

ARTHUR J. BOYNTON, OF WINNETKA, ILLINOIS, ASSIGNOR TO H. A. BRASSERT & COMPANY, OF CHICAGO, ILLINOIS, A CORPORATION OF ILLINOIS

PROCESS FOR PREPARING SLIMES DERIVED FROM WET WASHING OF GAS FOR SINTERING

No Drawing. Application filed October 27, 1927. Serial No. 229,280.

This invention relates to a method of preparation of metallurgical slimes for the sintering process, and particularly to the slimes produced in the wet washing of gases produced by the iron blast furnace. The process of cleaning these gases in the wet way is now nearly universal in most of the iron producing districts of this country. This wet washing when practiced in connection with furnaces using Lake Superior ores results in a production of approximately one hundred and twenty-five (125) pounds of slime per ton of pig iron, the slimes containing about forty per cent (40%) of metallic iron. Practically four-fifths of the pig iron produced in this country is made from Lake Superior ores, and the metallic iron in these slimes approximates eight hundred thousand tons per year.

Ever since the application of sintering to blast furnace flue dust, the desirability of sintering the sludge produced by wet washing has been recognized, and many attempts to sinter this by-product have been made. These have been successful only where a small percentage of sludge has been mixed with a large percentage of dry flue dust, the proportion of sludge being much less than that corresponding to its rate of relative production. Attempts to use such a proportion have met with failure on account of the impervious nature of the mixture and the failure to force sufficient air and products of combustion through the sintering mass to support the sintering process.

Attempts to sinter sludge have heretofore been based on the idea that the drying of the sludge down to the percentage of water which gave good results when applied to dry dust was the proper procedure. This idea is erroneous, because the sludge retains its impervious character down to complete dryness, and only attains maximum volume when water is added to the dry dust. I have discovered, however, that complete drying of the sludge, even though the dried material is separated to its original grains, with subsequent addition of water will permit the sintering operation to be successfully carried on.

I have also found that where the gas washer sludge is recovered in the form of a filter cake, a still more desirable state of preparation is possible. The filter cake is cohesive when dry, and excepting where deliberate crushing is practiced the dried cake will consist of pieces much larger than the original grains, some of them being too large to be successfully sintered. Proper preparation includes the mechanical breaking up of the dried filter cake into pieces of one-half inch size or less, with a minimum breakage down to the original grain size. With such a state of preparation the sintering of one hundred per cent (100%) of dried sludge is possible, and the sintering is more easily and successfully carried on than is the case with the dry granular dust heretofore usually sintered.

I have also found that excessive degradation in the size of the dried sludge can be prevented by feeding to the tank of the filter press in which the sludge is treated a relatively small quantity of dilute milk of lime. This lime is incorporated in the mass of the filter cake and acts as a binder to the dry sludge.

The volume of a cubic foot of dry flue dust, as well as of other granular materials, is progressively increased by additions of water thoroughly mixed with the dry mass. The increase is not due to swelling of the particles, but to the fact that said particles are held apart and the interval between them increased by the presence of the water. After a definite percentage of water content is reached, which in the case of flue dust is about fourteen per cent (14%) by weight, further additions of water result in a decreased volume and a lessened permeability to the passage of air or gases between the particles, as the flue dust takes on the character of a mud or slime. The percentage of water to be added in the preparation of the dried sludge for sintering, as hereinbefore described, should be about that found desirable in the case of dry flue dust.

I claim as my invention:

The process of preparation for sintering of sludge recovered from blast furnace gases by wet cleaning, which consists in complete drying by application of heat and subsequent moistening.

In testimony that I claim the foregoing as my invention, I affix my signature this 13th day of October, A. D. 1927.

ARTHUR J. BOYNTON.